Oct. 29, 1968 R. G. GIBSON ET AL 3,408,637

ADDRESS MODIFICATION CONTROL ARRANGEMENT FOR STORAGE MATRIX

Filed July 20, 1964 4 Sheets-Sheet 1

INVENTORS
ROBERT G. GIBSON
RICHARD A. STEIGERWALD
RICHARD A. IDE
BY Henry E. Otto Jr.
ATTORNEY

United States Patent Office 3,408,637

Patented Oct. 29, 1968

3,408,637

ADDRESS MODIFICATION CONTROL ARRANGEMENT FOR STORAGE MATRIX

Robert G. Gibson, Binghamton, Richard A. Steigerwald, Vestal, N.Y., and Richard A. Ide, Sweet Valley, Pa., assignors to International Business Machines Corporation, New York, N.Y., a corporation of New York Filed July 20, 1964, Ser. No. 383,612

12 Claims. (Cl. 340—174)

ABSTRACT OF THE DISCLOSURE

A storage matrix is operable during one storage cycle to maintain one portion of a word fixed while moving another portion of the word to another position with or without modification. Column drive lines are arranged in a control group and two or more data groups. Each column drive line in the control group is connected to a corresponding column drive line in each data group. Driver gates selectively complete series circuits through a desired column drive line of the control group and its corresponding column drive line in a desired data group. By selecting one data group column drive line during the read portion of the storage cycle and another data group column drive line during the write portion of the storage cycle, data can be transferred between data groups during one storage cycle, while the data in the control group is maintained fixed.

This invention relates to data storage systems, and relates more particularly to those permitting address modification within a single complete storage cycle.

There are mony configurations of coincident current storage matrix systems wherein a plurality of magnetic cores arranged in columns and rows are inductively coupled to respective row windings and column windings, to permit the unique selection of any core in a particular plane according to which of the row and column windings are energized. It is known to provide a matrix storage system wherein one column winding and two distinct row windings are concurrently selected to pemit data to be read from or written into two addresses simultaneously. It is also known to provide so-called phase reversal by connecting two row windings serially but winding them in opposite senses through all cores of their respective rows, such that cores in only one of the rows will be energized by half-select coincident currents.

So far as is known, no data storage devices have heretofore been proposed which during a selectable single storage cycle can maintain one portion of an address fixed, but permit partial change or modification of the remaining portion of the address. Such an arrangement would be highly desirable, for example, in the data transmission field. In such case, one data storage area could be used for storing bits of a character as they are received from a transmission line or transferred to such line; and additional data storage areas could be provided to store data awaiting transfer to a central processing unit or the transmission line, depending upon whether the line is receiving or transmitting, respectively. Such an arrangement would permit data to be shifted from one data storage area to another within the same storage cycle, with or without modification during the write portion of said cycle, and thus increase the overall operating speed and efficiency of the data transmission system.

It is therefore one object of this invention to provide a data storage system wherein during a selectable storage cycle one portion of an address will remain fixed while the remaining portion of the address may be partially changed or modified.

Another object is to provide a data storage system wherein all data stored in a control area is read out into a control register during a storage cycle, and data stored in only one of a plurality of data areas is simultaneously read out into a single data register according to which of said data areas is uniquely selected.

A further object is to provide a data storage system of the type described in the preceding object, wherein data read out from any one of said data areas during the read portion of a storage cycle may be written back from the register either identically or with modification into another data storage area during that same storage cycle.

Still another object is to provide a data storage system of the above general type wherein the data stored in the control area includes indicia denoting which of said data areas contains data.

A further object is to provide a data storage system of the above general type wherein as data is written into the various data areas, data in the control area is automatically modified to indicate that such data area contains data.

According to these objects, the data storage system embodying the invention comprises at least three different matrix groups of bistable storage elements, such as magnetic cores, electrically arranged in columns and rows. These groups comprise one or more control areas from which data is read out simultaneously to a control register; and there are at least two data areas from which data is read out selectively into a common data register. This type of operation is effected by having corresponding column conductors of each control area connected serially, and connecting such control area column conductors in parallel with the respective corresponding column conductors in the various data areas. A gating means permits selection of any one, but only one, of the data areas. Hence upon application of an electrical signal to a selected column in one control area, an electrical circuit will be completed through the serially connected corresponding column conductor in each other control area (if any), thence through a corresponding column conductor in only that particular one of the data areas effectively activated by the gating means. Thus, during the read portion of a storage cycle, data will be read out from each control area into the control register, and from one of the data areas into the data register. If the gating means is actuated to render a different data area effective before the write portion of the storage cycle, data will be circulated from the data register back into such different data area during the write portion of the storage cycle. The data thus written may be either identical with that stored in the first data area or modified according to the manner in which inhibit circuitry is controlled. The data stored in the control area preferably includes one or more bit positions indicative of the status of the data areas; i.e., information as to which data areas contain data.

The foregoing and other objects, features and advantages of the invention will be apparent from the following more particular description of preferred embodiments of the invention, as illustrated in the accompanying drawings, wherein.

*Description—FIGS. 1 to 4*

Figure 1:
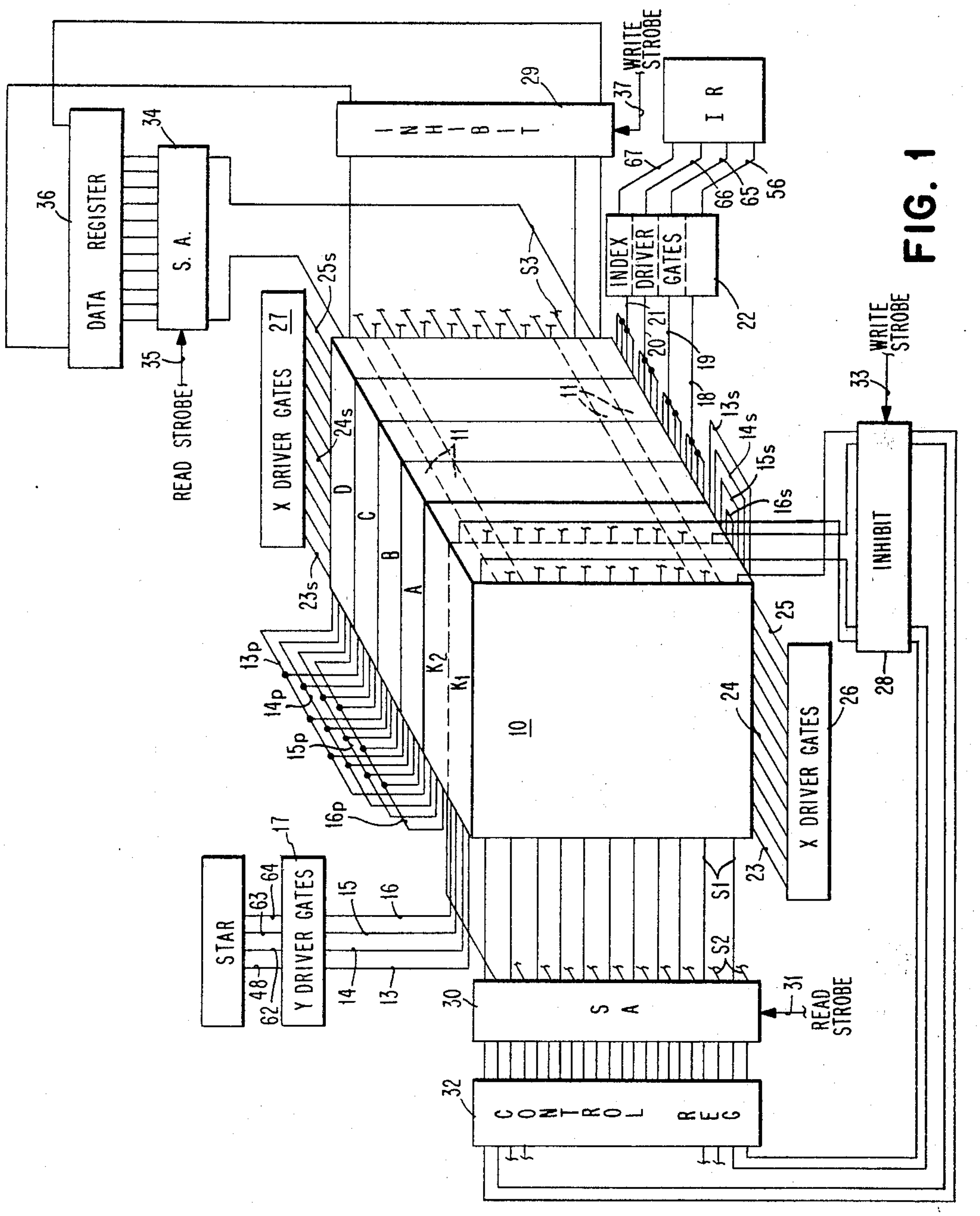
FIG. 1 is a circuit diagram of a data storage system embodying the invention.
Figure 2:
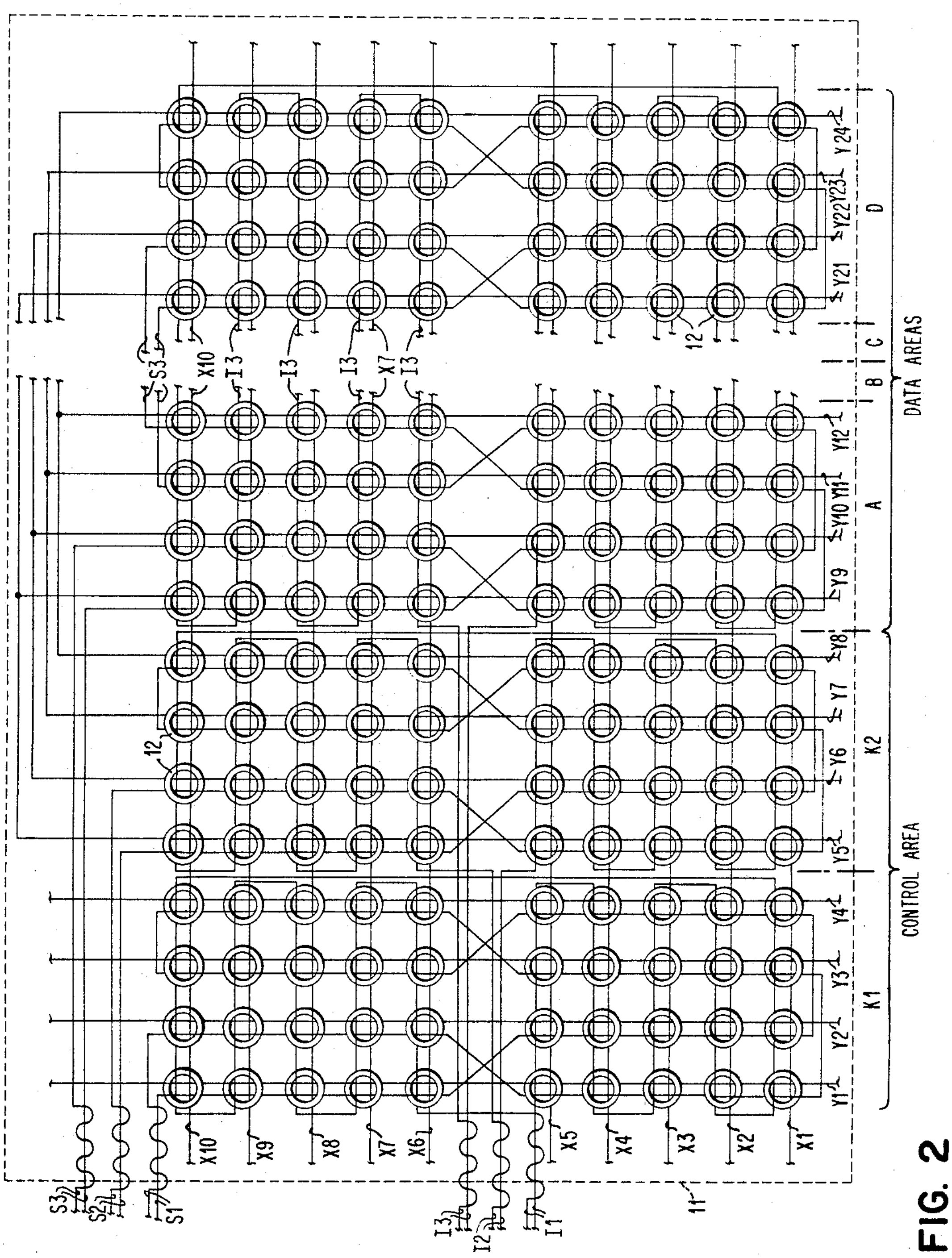
FIG. 2 is a plan view, partially boken away, showing how the drive, sense and inhibit conductors are threaded through and inductively coupled to the magnetic cores in a typical plane of the multi-area storage matrix.

As illustrated in FIGS. 1 and 2, the binary data storage system embodying the invention comprises a storage unit 10 formed of eleven core planes 11 arranged in a stack. Each core plane comprises a matrix array of magnetic cores 12 having substantially rectangular hysteresis loop characteristics. As illustrated, in each core plane there are ten X drive lines or row conductors X1 to X10 (FIG. 2), each passing through and inductively coupled to a different one of ten rows of cores; and there are twenty-four Y drive lines or column conductors Y1 to Y24 (FIG. 2), each passing through and inductively coupled to a different one of twenty-four columns of cores. These X and Y drive lines are threaded back and forth in the X and Y directions, respectively, through each successive core plane of the stack to serially connect the drive lines from plane to plane in conventional manner.

According to a feature of the invention, each core plane is divided into six identical matrix groups K1, K2, A, B, C, D, each comprising four columns of cores and ten rows of cores. The core planes 11 are assembled and jumpered such that wires 13, 14, 15, 16 connect Y driver-gate decode circuits 17 to the upper ends as viewed in FIG. 1) of respective ones of the four Y drive lines of matrix group K1; and the lower ends of said Y drive lines are connected serially by respective corresponding jumper wires **13*s*, 14*s*, 15*s*, 16*s* to the lower ends of the four Y drive lines of matrix group K2. The upper ends of the latter drive lines are then connected in parallel to the upper ends of the corresponding Y drive lines of groups A, B, C and D via branches of respective jumper wires 13*p*, 14*p*, 15*p*, 16*p*. At their lower ends, all Y drive lines of group A are connected in parallel to an index control wire 18; and similarly, all Y drive lines within each particular group B, C and D are connected in parallel to separate corresponding index control wires 19, 20 and 21, respectively. These wires 18 to 21 are connected to index driver-gate decode circuits 22**.

The X drive lines X1 to X10 in corresponding rows of each core plane 11 are connected serially in conventional manner, as already stated. Thus, ten wires including, for example, 23, 24, 25, connect the lower ends of the respective ten X drive lines to X driver-gate decode circuits 26; and ten corresponding wires, including **23*s*, 24*s*, 25*s*, provide a serial connection from the upper ends of the respective X drive lines to X driver-gate decode circuits 27**.

In the arrangement just described, the groups K1, K2 constitute a double-width control area providing a 22-bit control word or character because the corresponding four Y drive windings of K1 and K2 are serially connected. However, the remaining groups A, B, C, D constitute single-width data areas, each providing an 11-bit word or character because their corresponding four Y drive windings are connected in parallel by wires **13*p* to 16*p*. Thus, for example, if current is supplied from Y driver-gate decode circuits 17 to a selectable Y drive line (e.g., 14), such current would flow serially via jumper wire 14*s* through corresponding columns of cores in the control area K1, K2 and then flow via a branch of jumper wire 14*p* through only one of the data groups A to D according to which wire 18, 19, 20 or 21 is then connected to ground via the index driver-gate index decode circuits 22**.

As shown in FIG. 2, there is associated with each core plane 11 a sense line S1 passing through and inductively coupled to all forty cores in control area group K1, a separate sense line S2 serially coupled to all forty cores in control area group K2, and a third sense line S3 inductively coupled to all 160 cores in data area groups A to D. Thus, there are twenty-two sense lines for control area K1, K2, and only eleven sense lines for the entire data area A to D.

As also shown in FIG. 2, there are associated with each core plane 11 separate inhibit lines I1, I2, each inductively coupled to the forty cores in control area groups K1, K2, respectively, and a separate inhibit line I3 inductively coupled to the entire 160 cores in data area groups A to D. Thus, as in the case of the sense lines, there are twenty-two inhibit lines for the control area and only eleven for the data areas (one for all four data areas or groups in each plane). As is conventional, the inhibit lines I1, I2, I3 pass through all cores of each plane parallel with the X drive lines; and they cancel the effect, at write time, of the half-select current in the X drive line by carrying an opposing half-select current to cause the selected core to remain at "0" state. These opposing half-select currents are supplied by an inhibit driver (not shown) forming part of inhibit circuits 28 serving the control area K1, K2 and an inhibit driver (not shown) forming part of inhibit circuits 29 serving the data areas A, B, C, D.

The core matrix unit 10 as illustrated thus provides forty (10×4) control area addresses and 160 data addresses (40 in each of the data areas A to D). When a particular address, like "14," is selected by coincident half-select currents supplied through lines 14, 18 and **24, 24*s*, respectively, a voltage pulse will be induced in the corresponding sense lines S1, S2 in those bit positions at address "14" in the control area K1, K2 where a binary "1" had been stored; and a voltage pulse will likewise be induced in sense line S3 in those bit positions where a binary "1" had been stored at address 14 in the particular single data area A, B, C or D which is then rendered effective by connection to ground through the index driver-gate circuits 22**.

The data stored in the twenty-two bits at the selected address in control area K1, K2 will thus be read out during "read time" (FIG. 4) into sense amplifiers 30. At "read strobe time," a strobe pulse will be delivered to line 31 (FIG. 1) to cause the data to be transferred out in parallel from sense amplifiers 30 to a control register 32. At "inhibit time" (FIG. 4), the data stored in the control register 32 will be transferred to inhibit circuits 28; and at "write strobe time" (FIG. 4), a pulse will be delivered to a line 33 to cause data to be written back into the control area K1, K2.

Meanwhile, the data stored in the eleven bits at the particular address of the activated single data area A, B, C or D will be read out during "read time" into sense amplifiers 34. A pulse to a line 35 at "read strobe time" will cause transfer of data in parallel from sense amplifiers 34 into a data register 36. Thereafter, at "inhibit time" the data will be transferred to the inhibit circuits 29, whence it will be written back into one of the data areas A, B, C or D when a "write strobe" pulse is applied to a wire 37.

According to a feature of the invention, while the selected address (illustratively assumed as "14") remains constant, it is possible after data has been read from one data area group (e.g., A) during the first part of a storage cycle to write data back into another data area group (e.g., B) during the latter part of the same storage cycle. This is effected by conditioning the index driver-gate decode circuits 22 to complete a circuit through wire 18 until after the "read strobe" pulse dies (FIG. 4); and then before "inhibit time" (or, at least, before "write strobe time") reconditioning circuits 22 to complete a circuit through wire 19 (or 20 or 21).

This feature permits partial modification of the address within any single storage cycle. More specifically, it retains the 22-bit control area portion of the address intact, but enables substitution of a different 11-bit data area portion within the same storage cycle. It also permits the data stored in one portion of the data area to be transferred to another portion of the data area, with or without modification by the inhibit circuits 28. Similarly, the inhibit circuits 28 permit data stored in the 22-bit control area portion of the selected address to be modified, if desired, in conventional manner, as such data is written back into the control area K1, K2 during the write portion of the cycle.

Figure 3:
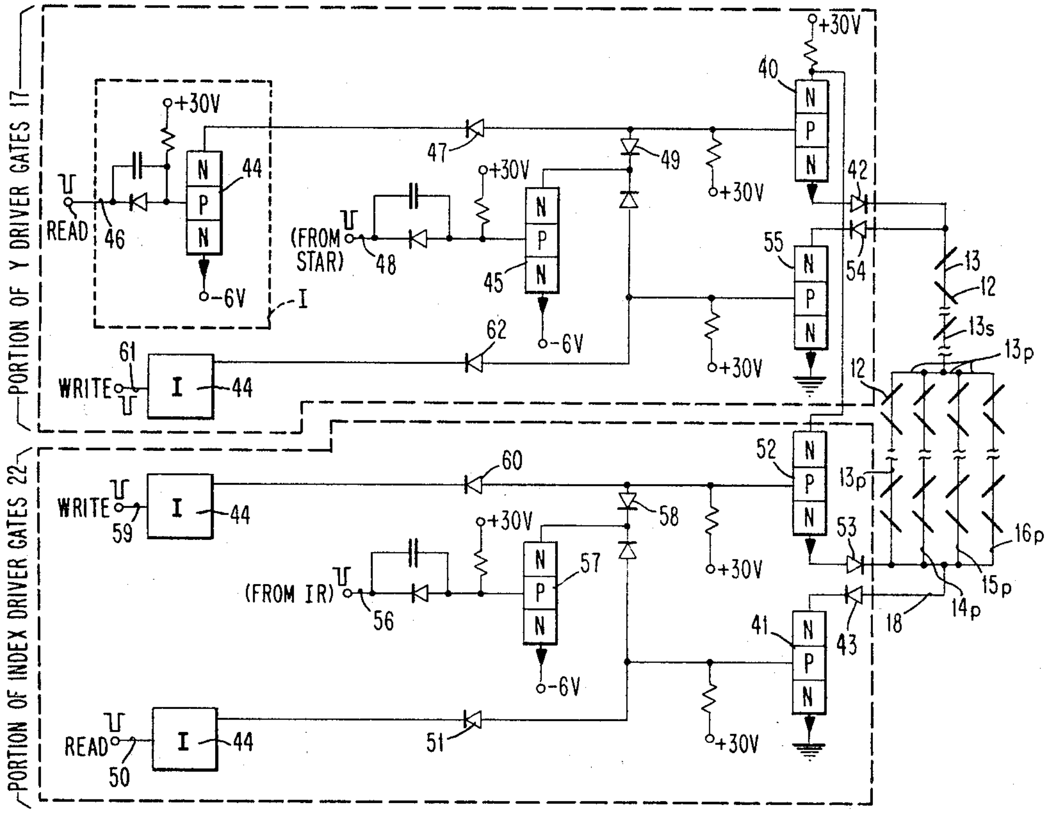
FIG. 3 is a circuit diagram of read-write circuitry that may be used in the data storage system.

FIG. 3 shows those portions of the Y and index driver-gate decode circuits 17 and 22 for the Y dimension that permits a half-select energizing current to flow via conductors 13, 13*s*, 13*p* and wire 18. These decode circuits include transistors 40, 41 that must be concurrently turned ON to permit current to flow downward (as viewed in FIG. 3) from +30 volts via transistor 40 and a diode 42 through the cores at the particular storage address and thence via a diode 43 and the transistor 41 to ground to read data out of the cores in the control and data areas defining said address. Transistor 40 will be turned ON only if the normally ON transistors 44, 45 are concurrently turned OFF. Transistor 44 forms part of an inverter circuit I and is turned OFF by a DOWN-level pulse delivered to a line 46 in the control area at "read time;" and when turned OFF, transistor 44 interrupts a normal connection of the base of transistor 40 to −6 volts via a diode 47 and the transistor 44. Transistor 45 is turned OFF by a DOWN-level pulse delivered to a particular associated address line 48 from a storage address register STAR; and when turned OFF, transistor 45 cuts OFF the normal connection of the base of the transistor 40 to −6 volts via the diode 49 and the transistor 45.

Meanwhile, transistor 41 will be turned ON by a DOWN-level pulse delivered to a line 50 at "read time." This pulse causes the transistor 44 of the associated inverter I to turn OFF, thus interrupting the connection of the base of transistor 41 to −6 volts via a diode 51. This enables the base of transistor 41 to be charged to +30 volts and thus turn transistor 41 ON to complete the circuit through diode 43 to ground.

To write in a string of cores at the particular storage address, current must pass upwardly (as viewed in FIG. 3) through the cores from +30 volts via the collector and emitter of a transistor 52, a diode 53, the string of cores 12, a diode 54 and thence via the collector and emitter of the transistor 55 to ground. To accomplish this, transistors 52 and 55 must be turned ON concurrently. Transistor 52 is turned ON by supplying a DOWN-level pulse from an index register IR to an address line 56 which, as illustrated, controls data area A. This pulse to line 56 turns a transistor 57 OFF and thus cuts off connection of the base of transistor 52 to −6 volts via a diode 58. Meanwhile, a DOWN-level pulse must also be applied at "write time" to a line 59 to cause the transistor 44 of associated inverter I to turn OFF and thus interrupt connection of the base of transistor 52 to −6 volts via a diode 60. Also, transistor 55 must be turned ON by a DOWN-level pulse delivered to a line 61 in the control area at "write time." This pulse will cause the transistor 44 of the associated inverter I to turn OFF, thus cutting off the connection of the base of transistor 55 to −6 volts via a diode 62. This applies +30 volts to the base of transistor 55 and thus turns said transistor ON to permit the circuit to be completed from +30 volts through the base-emitter junction of transistor 52 and diode 53 to ground.

Note that the various diodes 42, 43 and 53, 54 thus act as isolation diodes. Also note that the current flows via lines 13, 13*s* in parallel to line 13*p*; but since index control wire 18 is the only one then connected to ground by the index driver-gate circuits 22, current will flow only through the single string of cores in data area A. Note also that a separate transistor 45 is provided for each line 13, 14, 15, 16; and addressing of each such line is controlled by lines 48, 62, 63, 64 (FIG. 1), respectively, by circuitry similar to that already explained. Likewise, a separate transistor 57 is provided for each index control wire on line 18, 19, 20, 21; and addressing of each such line is controlled by lines 56, 65, 66, 67 (FIG. 1), respectively, as above explained.

Figure 5:
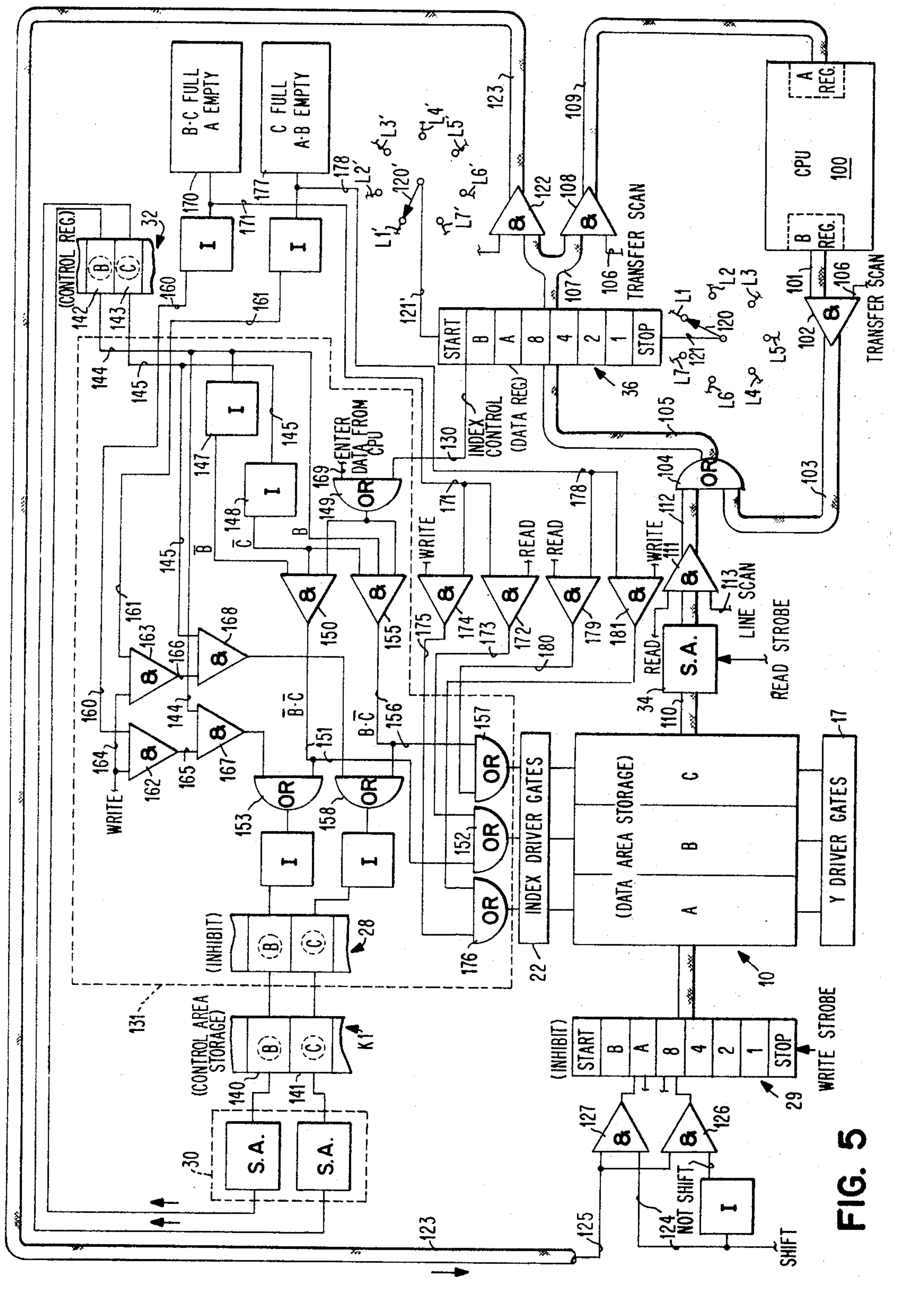
FIG. 5 is a circuit diagram of a modified embodiment of the invention, wherein the control area includes certain bit positions, the condition of which denotes those data storage areas containing data.

*Description—FIG. 5*

This figure illustrates a data transmission apparatus embodying a binary data storage system constructed according to a variation of the invention. For brevity, identical reference numerals have been used in FIG. 5 to denote structure identical with that already described in connection with FIGS. 1 to 4.

As illustrated, the data transmission apparatus comprises a central processing unit (CPU) 100 from which data can be transmitted in parallel to data register 36 in BCD code via a network including a B register (B Reg), a cable 101, an AND gate 102, a cable 103, an OR gate 104, and a cable 105, if and when gate 102 is activated by a signal to a transfer scan line 106 and other controls (not shown). Data may also be read out in parallel from data register 36 into the CPU 100 via a branch of a cable 107, an AND gate 108, a cable 109 and an A register (A Reg), provided gate 108 is activated by a signal to transfer scan line 106 and additional controls (not shown).

However, data may also be transferred in parallel to data register 36 from one of the data areas A, B or C of core storage unit 10 via a cable 110, sense amplifiers 34, an AND gate 111, a cable 112, OR gate 104 and cable 105, if and when AND gate 111 is activated by a signal to a line scan wire 113 and a read pulse.

Data may also be entered serially bit-by-bit into data register 36 from any one of a plurality of transmission lines L1 to L7. The bit positions in data register 36 are as shown in FIG. 5. The logical "1" bit level is called a data-mark level; and the logical "0" or no-bit level is a data space. When successive bits are of the same level, no change in line signal occurs. Bit recognition is effected by periodically sampling or poling the line level. As illustrated, this poling is effected by a rotating contact arm 120 that sweeps by and makes contact successively with each line L1 to L7 for completing a circuit between a line terminal and a wire 121 connected to the end of data register 36.

The voltage in a particular line will remain at data-mark level indefinitely until such line actually contains data. Then it will change to the no-bit or data-space level where it will always remain for a predetermined period of time corresponding to the time interval necessary for transmission of a single bit. Moreover, it is to be understood that multiple characters in succession may be transmitted; and if another character is not fully formed or ready for transmission at the completion of transmission of the preceding character, the line will revert to its inactive status in which the voltage returns to the data-mark or "1" level.

Assume now that the line L1 has a character ready for transmission. When arm 120 poles line L1, it will detect that the line level has dropped from data-mark or "1" level to the no-bit or "0" level. This will signify the beginning of a character, because a start bit of data-space level is always added at the start of each character and a stop bit at data-mark level is always added at the end of a character. During transmission of a character, the voltage in line L1 will alternate between no-bit level and mark level according to the bit configuration of the character.

At the start of transmission, a "0" will be entered in the stop-bit position, and "1's" will be entered in all remaining bit positions of the data register 36. At write time, a write pulse and other controls (not shown) will activate an AND gate 122 for transmitting data in parallel to a cable 123. When a bit is being entered serially into the data register 36 from a line L, a shift control signal will be supplied to a line 124 having branches each connected to a separate AND gate for each bit position to effect a one-position shift in the data as it is read back into assembly area A. As illustrated, a single line 125 is shown exiting from cable 123 with branches leading to AND gates 126, 127. The data in 125 had in the previous cycle been written into bit position "8." When no shift signal is present in line 124, data will be written back into the bit position whence it originated (e.g., "8" in the example illustrated). But if a signal is present in line 124, the data will be written back into the inhibit circuits 29 with a one-position shift (e.g., from "8" to "A" in the example illustrated). Thus, during transmission of a character, data will be recirculated from the data register 36 through the assembly area A, with successive one-position shifts, as bits are successively entered into the end of the data register 36, until the "0" entered into the stop-bit position at the beginning of transmission finally is shifted into the start-bit position. When this occurs, the character will have been completely assembled into the data register, and it is ready to be transferred into data storage area B or C awaiting transmission to the CPU 100. To signify that the character has been completed and that this stage of readiness has been achieved, a pulse is supplied to an index control line 130 as the zero bit (entered into the stop-bit position when transmission started) finally passes into the start-bit position of the data register. This pulse to wire 130 conditions buffer control circuitry, designated generally 131, to control whether the completed character will be transferred during the write portion of the storage cycle into data area B or data area C, in the manner presently to be explained.

According to a feature of this variation of the invention, the control area K1 (shown only in part in FIG. 5) has two "status" bit positions 140, 141 which denote whether data is stored in the B and C areas, respectively. In the apparatus illustrated, a "1" will be stored in position 140 if a character is stored in area B; and similarly a "1" stored in position 141 will indicate that a character is stored in area C. This information forms part of the control word or character stored in the control area K1, K2; and hence it is read out at "read time" into the sense amplifiers 30 and thence into corresponding bit positions 142, 143 in control register 32 at "read strobe time," in the manner explained in connection with the description of FIGS. 1 to 4.

Figure 4:
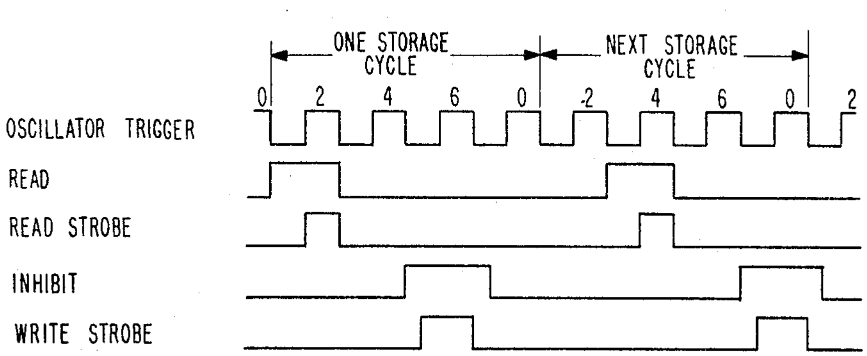
FIG. 4 is a timing diagram.

Assume now that a complete character has just been formed in the data register 36 and produced an UP-level signal in index line 130; and that it is now "write time" and hence data from bits 142, 143 and other bits of the control word are being transferred out of the control register 32. If data areas B and C are both devoid of characters, bit positions 142 and 143 will be in their zero state and hence cause DOWN-level signals in lines 144 and 145. Under this condition, the inverters 147, 148 will produce UP-level signals which, together with the UP-level signal transmitted via OR gate 149 from index control line 130, will satisfy an AND gate 150 to produce an UP-level output in line 151. This latter signal will be transmitted via OR gate 152 for conditioning the index driver gates 22 to complete the addressing circuit through the B data area and Y driver-gate circuits 17. This in turn will cause the character to be written broadside (i.e., in parallel) into data area B at "write strobe time" (FIG. 4). Meanwhile, the UP-level output signal in line 151 will also be transmitted via an OR gate 153 and inverter I to condition the control area inhibit circuits 28 to cause a "1" to be entered in the control area storage bit position 140, and thereby denote that a character is now stored in data area B.

Assume now that another character is entered serially bit-by-bit from one of the lines L in similar manner into data register 36. When such character is fully assembled in the data register, AND gate 150 will not be satisfied because a "1" will be stored in bit position 142. However, AND gate 155 will be satisfied by the UP-level signal in index control line 130 and the "data in B but not in C" condition. This will produce an UP-level output in a line 156 that will be transmitted via an OR gate 157 for conditioning the index driver-gate circuits 22 and 17 to cause the character to be written broadside into data area C at "write strobe time" (FIG. 4). Meanwhile, the UP-level signal in line 150 will be transmitted via an OR gate 158 and inverter I to condition the inhibit circuits 28 to cause a "1" to be entered in control area storage bit position 141 to denote that a character is now stored in data area C.

Meanwhile, while no characters are being entered serially into the data register 36 from one of the lines L or in parallel from the CPU 100, the data in the control register 32 and the data register 36 will be regenerated repeatedly without modification during subsequent storage cycles. That is, data will be read out of the storage array 10, into the two registers 32, 36 and written back without change into the array.

According to a feature of the invention, the "1" stored in control area bit position 140 and/or 141 denoting that a character is stored in data area B and/or C will be regenerated repeatedly until the character is transferred out of such bit position. This is accomplished by supplying UP-level signals to lines 160 and 161, respectively, via corresponding inverters I when the conditions "B and C areas full and A area empty" and "C area full and areas A and B empty" are respectively not met. These UP signals in 160 and 161 are ANDed at 162 and 163, respectively, with a "write pulse" from a line 164 to create UP level "regen" outputs in lines 165 and 166, respectively The signal in 165 is ANDed at 167 with a "1" in line 144 to condition the inhibit circuits 28 to provide a "1" in bit position 140; and similarly the signal at 166 is ANDed at 168 with a "1" in the output from bit position 143 for conditioning the inhibit circuits 28 to provide a "1" in bit position 141.

It will thus be seen that when the index control signal comes UP in line 130, the B bit is transferred out of control register 32; and if a "1" is present in said bit position indicating that the data area B is already filled, then the B "1" bit will be regenerated. Similarly for the C bit. Once a "1" is written into the bit position 142 or 143, the corresponding line 160 or 161 will receive an UP-level signal; and such signal will remain UP so long as a character remains in the data area B or C, respectively.

A "1" bit in control storage bit positions 140 and/or 141 signifies that characters are stored in data areas B and/or C and available for transfer either to the lines L1′ to L7′ or to the CPU 100.

To transfer data out to any one of the lines L1′ to L7′, data must be transferred broadside from area B or C into area A during the write portion of the cycle. Thereafter, the character is read out serially from the data register 36 via line 121′ and rotating contact arm 120′ into a desired one of the lines L1′ to L7′ during successive storage cycles by successive one-position shifts as data is written back into the inhibit circuits 29, as already described.

On the other hand, data may be transferred out broadside from one data register 36 to the CPU 100 directly from data area B or C via cable 109, as already described, and without intervening transfer to assembly area A. If desired, characters may now be entered successively during subsequent storage cycles into the data register 36 in parallel from the CPU 100 via the B register, as already described. During the write portion of each successive cycle, one such character may be written directly into the data area B or C (without intervening transfer through the assembly area A) by appropriate conditioning of the buffer storage control circuitry 131. In the embodiment illustrated, such conditioning is effected by supplying an UP-level signal to an "enter data from CPU" line 169 from suitable means (not shown). This will condition the circuitry 131 to act in the same manner as already described when an UP-level signal is provided in the index control line 130.

In any event, according to another feature of the invention, when either data area B or C is completely cleared of a character, a zero bit will be written into the control area storage bit position 140 or 141, respectively. This is accomplished in the following manner: Whenever the B and C areas are full and area A is empty, a gate 170 will be activated to produce an UP-level signal in a line 171. At "read time," this signal in line 171 will be ANDed at 172 with a read pulse to produce an UP-level pulse in line 173 leading to OR gate 152. This will complete a circuit through the index and Y driver gates 22, 17 for causing data to be read broadside out of area B into the data register 36 at "read strobe time." Thereafter, at "write strobe time" during the same storage cycle, the data read out of area B will be written back into assembly area A. This is because the signal in a branch of line 171 will be ANDed at 174 with a write pulse at "write time" and produce an UP-level signal in a line 175 leading to an OR gate 176 to complete a circuit through area A via the driver gates 22, 17 to condition A to receive the data from inhibit circuits 29 at "write strobe time."

Meanwhile, since no UP-level signal is now provided in line 160, gate 167 will not be enabled. Also since the C area still contains data, gate 150 will not be enabled. With DOWN-level inputs to both legs of OR gate 153, the associated inverter I will provide an UP-level signal to turn ON the related inhibit driver (not shown) of the inhibit circuits 28 to cause a "0" to be written into bit position 140 of the control area K1. This will denote that data area B is now devoid of characters.

Similarly, a "1" bit entered into bit position 141 of control area K1 to denote that the C area contains data will be regenerated automatically until the signal in line 161 goes DOWN. This will occur when a gate 177 is activated as a result of the C area being full while the A and B data areas are both empty. The resultant UP-level signal from gate 177 into a line 178 will be ANDed at 179 with a read pulse at "read time" to produce an UP-level output in a line 180 leading to OR gate 157. This will condition the driver gates 22, 17 to cause data to be read out of area C broadside into the data register 36 at "read strobe time"; and then at "write time," a write pulse ANDed at 181 with the UP-signal in a branch of line 178 will condition the driver gates 22, 17 to cause the data read out of area C to be written back into assembly area A at "write strobe time" via the inhibit circuits 29, in the manner already explained in detail.

Meanwhile, since both inputs to OR gate 158 will now be negative, the inverter I will produce an UP-level output. This will condition the inhibit circuits 28 for the control area to cause a "0" to be written into bit position 141 of control area K1 at "write strobe time," as above more fully explained.

Data thus read back into assembly area A from either area B or C can now be transferred to one of the lines L1′ to L7′ in deserialized fashion, in the manner already explained in detail.

It is to be understood that, as used in the claims, the term "electrically arranged in columns and rows" connotes an electrical arrangement having the characteristics of a matrix array irrespective of whether the elements are physically arranged in true orthogonal matrix-like relationship. Also, the term "bistable storage elements" is intended generically to cover capacitors, resistors, etc., as well as magnetic cores having square hysteresis loop characteristics.

While the invention has been particularly shown and described with reference to preferred embodiments thereof, it will be understood by those skilled in the art that various changes in form and details may be made therein without departing from the spirit and scope of the invention.

What is claimed is:

1. A data storage system of the type including a plurality of bistable storage elements forming at least three matrix groups and electrically arranged in columns and rows so as to be uniquely addressed by selection of selectable ones of column conductors and row conductors coupled respectively to all elements in corresponding columns and rows of each group, characterized by:

column select circuits, each including a first column conductor in one of said groups and a corresponding column conductor in each remaining group, each corresponding column conductor having one end connected to one end of its respective first column conductor and having its other end connected to the other ends of all other column conductors in its respective group, and means for transferring data between selectable ones of corresponding columns of said remaining groups during a single storage cycle without changing data in the related selected column in said one group, the latter means including gating means operative upon application of an electrical signal to a selected column conductor in said one group to complete a circuit through only one of the corresponding column conductors in said remaining groups.

2. In a data storage system of the type including a plurality of bistable storage elements forming at least three matrix groups and electrically arranged in columns and rows so as to be uniquely addressed by selection of selectable ones of column conductors and row conductors coupled respectively to all elements in corresponding columns and rows of each group, characterized by:

a plurality of wires each having branches for connecting one end of a respective column conductor in one of said groups to one end of each respective corresponding column conductor in the remaining groups, an additional plurality of wires each connecting together the other ends of all column conductors in a respective one of said remaining groups, driver-gating means coupled to the column conductors in said one group and remaining groups, and means for conditioning said gating means for completing a circuit through a selectable column conductor in said one group but through different ones of said remaining groups selectively at different times during a given storage cycle to cause the portion of the address contained in said remaining groups to be modified during such cycle without modifying the address in said one group.

3. In a data storage system of the type including a plurality of bistable storage elements forming at least three matrix groups and electrically arranged in columns and rows so as to be uniquely addressed by selection of selectable ones of column conductors and row conductors coupled respectively to all elements in corresponding columns and rows of each group, characterized by:

a plurality of wires each having branches for connecting one end of a respective column conductor in one of said groups to one end of each respective corresponding column conductor in the remaining groups, an additional plurality of wires each connecting together the other ends of all column conductors in a respective one of said remaining groups, driver-gating means coupled to the column conductors in said one group and remaining groups, and means for conditioning said driver-gating means for completing a circuit through a selectable column conductor in said one group and corresponding column conductors in different ones of said remaining groups selectively at different times during a given storage cycle to cause data to be transferred between said remaining groups during such cycle.

4. In a data storage system employing half-select coincident row and column signals to select a desired address at the intersection of selectable ones of a plurality of overlying row and column conductors arranged in at least three different matrix groups, means connecting each respective column conductor in one of said groups to one end of each corresponding column conductor in the remaining groups, means connecting the other end of each column conductor in said remaining groups to all other column conductors in its group, driver-gating means coupled to the column conductors of said one group and said remaining groups, and means for conditioning said driver-gating means for completing an electrical signal circuit through a selectable column conductor in said one group and a corresponding column conductor in one of said remaining groups during the read portion of a storage cycle and a different one of said remaining groups during the write portion of the same cycle to maintain the portion of the address in said one group intact but modify the portion of the address contained in said remaining groups.

5. In a data storage system employing half-select coincident row and column signals to select a desired address at the intersection of selectable ones of a plurality of overlying row and column conductors arranged in at least three different matrix groups, means connecting each respective column conductor in one of said groups to one end of each corresponding column conductor in the remaining groups, means connecting the other end of each column conductor in said remaining groups to all other column conductors in its group, driver-gating means coupled to the column conductors of said one group and said remaining groups, means for transferring data between said remaining groups during a single storage cycle, said means including means for conditioning said driver-gating means to complete an electrical signal circuit through a selectable column conductor in said one group and a corresponding column conductor in one of said remaining groups during a read portion of such storage cycle and a different one of said remaining groups during a write portion of the same cycle, and means including inhibit circuitry for modifying such data as it is transferred from said one remaining group to said different remaining group during said same storage cycle.

6. The combination according to claim 5, wherein said one group contains a plurality of bit positions, certain of which according to their bistable states denoting which and whether corresponding ones of said remaining groups contain data, and means including other inhibit circuitry responsive to storage of data in a particular one of said remaining groups and removal of such stored data to effect such changes in state in said certain bit positions.

7. The combination according to claim 5, wherein, one read-out means is provided for receiving data from said one group, and another read-out means serves all said remaining groups for receiving data selectively from that remaining group through which the circuit is completed by said driver-gating means.

8. An address control arrangement for a data storage system of the type including a plurality of bistable storage elements electrically arranged in columns and rows and divided into at least three different groups, characterized by:

a plurality of row conductors each coupled serially to all elements in corresponding rows of each group, a plurality of column inductors each coupled to all elements in a different column, a plurality of jumper wires each having branches for connecting one end of a different column conductor in a certain one of said groups to one end of each corresponding column conductor in a plurality of others of said groups, gating means coupled to said other groups and including for each such other group a different index control wire connected to the other ends of all column conductors in such group, means for activating said gating means for completing a circuit through a selected column conductor and the index control wire in one of said other groups upon application of an electrical signal to a selected column coil in said certain group, whereby data may be transferred between selected columns of said other group substantially without changing the data in the corresponding selected column in said certain group.

9. In a multi-plane matrix array of bistable storage elements, the combination of a plurality of row conductors serially coupling all elements in corresponding rows of the different planes, a plurality of column conductors serially coupling all elements in corresponding columns of the different planes, said column conductors being divided into at least one control group and at least two data groups, each such group having the same number of elements per plane, means connecting each column conductor of a control group to corresponding column conductors of the data groups, index driver-gating means coupled to said data groups, other drive-gating means coupled to the column conductors of each control group, and means for conditioning said index drive-gating means and other driver-gating means for completing an electrical circuit through a selectable column conductor in each such control group and through the coresponding column conductor in different ones of the data groups selectably at different times during a given storage cycle to cause data to be transferred between said data groups during a single storage cycle while maintaining the address within the control group constant.

10. The combination according to claim 9, including one control register having a plurality of bit positions corresponding to said same number multipled by the number of such control groups for receiving data read out concurrently from each data-storing position of all such control groups, and another register having a number of bit positions corresponding only to said same number for receiving data from only a selected one of said data groups at a time.

11. The combination according to claim 10, including a plurality of sense lines, one connected to elements of each control group in each plane and one connected to all elements of all data groups in each plane, a number of inhibit lines equal to the number of sense lines and each connected to the same elements as a corresponding sense line, separate inhibit circuits for the control groups and data groups, and controlled by the respective inhibit lines to permit modification of bits of data as they are read back into the control and data groups respectively during a storage cycle, whereby data read out of one data group may be written back modified or unmodified into the same or another data group during the write portion of the cycle, and data read out of the control groups may be written back modified or unmodified during a write portion of the cycle into the same control groups from which it was read out.

12. The combination according to claim 11, wherein certain elements at certain bit positions in at least one of the control groups denotes whether the data groups contain data, and means including the inhibit circuits responsive to storage of data in a particular data group to modify the state of the elements at said certain bit positions to denote changes in the storage condition in such data group.

References Cited

UNITED STATES PATENTS

| | | | |
|---|---|---|---|
| 2,882,517 | 4/1959 | Warren | 340—174 |
| 2,920,315 | 1/1960 | Markowitz et al. | 340—174 |
| 3,054,988 | 9/1962 | Edwards | 340—174 |
| 3,068,452 | 12/1962 | Sarrafian | 340—174 |
| 3,069,658 | 12/1962 | Kramskoy | 340—172.5 |
| 3,160,858 | 12/1964 | Adams et al. | 340—174 |
| 3,195,114 | 7/1965 | Gunderson et al. | 340—174 |

BERNARD KONICK, *Primary Examiner.*

B. HALEY, *Assistant Examiner.*